United States Patent
Matsunaga et al.

(10) Patent No.: US 10,067,506 B2
(45) Date of Patent: Sep. 4, 2018

(54) CONTROL DEVICE OF VEHICLE

(71) Applicant: Toyota Jidosha Kabushiki Kaisha, Toyota-shi, Aichi-ken (JP)

(72) Inventors: Masaki Matsunaga, Odawara (JP); Hideki Kondo, Mishima (JP); Yuichi Kumai, Gotenba (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 15/634,596

(22) Filed: Jun. 27, 2017

(65) Prior Publication Data
US 2018/0004205 A1  Jan. 4, 2018

(30) Foreign Application Priority Data
Jul. 1, 2016  (JP) .................................. 2016-131861

(51) Int. Cl.
| | |
|---|---|
| *G05D 1/00* | (2006.01) |
| *B60W 30/12* | (2006.01) |
| *B60W 30/16* | (2012.01) |
| *B60W 30/18* | (2012.01) |
| *G05D 1/02* | (2006.01) |

(52) U.S. Cl.
CPC ........... *G05D 1/0061* (2013.01); *B60W 30/12* (2013.01); *B60W 30/16* (2013.01); *B60W 30/18163* (2013.01); *G05D 1/024* (2013.01); *G05D 1/0246* (2013.01); *G05D 1/0257* (2013.01); *G05D 1/0274* (2013.01); *G05D 1/0278* (2013.01); *B60W 2540/22* (2013.01); *B60W 2550/10* (2013.01); *B60W 2550/12* (2013.01); *B60W 2550/308* (2013.01); *B60W 2550/402* (2013.01); *B60W 2600/00* (2013.01)

(58) Field of Classification Search
CPC ..... G05D 1/0061; B60W 30/12; B60W 30/16
USPC .......................................................... 701/25
See application file for complete search history.

(56) References Cited

U.S. PATENT DOCUMENTS

| | | | |
|---|---|---|---|
| 8,670,891 B1 | 3/2014 | Szybalski et al. | |
| 2007/0032913 A1* | 2/2007 | Ghoneim | B60W 30/16 701/1 |

FOREIGN PATENT DOCUMENTS

| | | |
|---|---|---|
| JP | H0986223 A | 3/1997 |
| JP | H11102157 A | 4/1999 |

OTHER PUBLICATIONS

U.S. Appl. No. 15/402,472, filed Jan. 10, 2017.

* cited by examiner

*Primary Examiner* — Yazan A Soofi
(74) *Attorney, Agent, or Firm* — Dinsmore & Shohl LLP

(57) ABSTRACT

A control device of a vehicle comprises: a driving plan generating part 90 configured to generate a driving plan in automated driving of the host vehicle; a package extracting part 91 configured to extract driving assistance packages packaging permissions for a plurality of driving assistance operations based on at least one of the surrounding environment information, the vehicle information, and the driver information; a package proposing part 92 configured to propose driving assistance packages to the driver of the host vehicle based on the driving assistance packages extracted by the package extracting part and the driving plan; and an automated driving executing part 93 configured to perform driving assistance operations permitted in a driving assistance package proposed by the package proposing part and approved by the driver of the host vehicle.

4 Claims, 14 Drawing Sheets

FIG. 4

| | DRIVING ASSISTANCE OPERATIONS |
|---|---|
| RUNNING ASSIST FUNCTIONS | VEHICLE DISTANCE CONTROL |
| | LANE TRACKING CONTROL |
| | AUTO LANE CHANGE |
| | AUTO PASSING |
| | AUTO BRANCHING |
| | AUTO MERGING |
| VISION ASSIST FUNCTIONS | LANE DEPARTURE WARNING |
| | BLIND SPOT MONITORING |
| | VEHICLE PROXIMITY ALARM |
| | PEDESTRIAN PROXIMITY ALARM |
| | HI BEAM AUTO CHANGE |
| | HEADLIGHT AUTO DIRECTION CONTROL |
| | HEADLIGHT/FOGLIGHT AUTO TURN ON |
| | WIPER AUTO OPERATION |
| | DEFROSTER AUTO OPERATION |
| | NIGHT VIEW AUTO OPERATION |
| | PROVISION OF SURROUNDING SITUATION |
| CONGESTION ASSIST FUNCTIONS | AUTO START FROM STOP AT CONGESTION |
| | HAZARD LIGHT TEMPORARY TURN ON CONTROL |
| | AUTO SWITCH OF CIRCULATION OF INSIDE/OUTSIDE AIR OF AC |
| | CHANGE OF SEAT POSITION |
| | PROVISION OF CONGESTION INFORMATION |
| | DISPLAY OF MOVING IMAGE |
| | AUTO ADJUSTMENT OF AUDIO VOLUME |
| | JERK REDUCING RUNNING CONTROL |

FIG. 5

| | DRIVING ASSISTANCE OPERATIONS | CLEAR | RAIN | HEAVY RAIN | SNOW | HEAVY SNOW | FOG | DENSE FOG | WINDY | STRONG WIND |
|---|---|---|---|---|---|---|---|---|---|---|
| RUNNING ASSIST FUNCTIONS | VEHICLE DISTANCE CONTROL | ○ | ○ | ○ | ○ | ○ | ○ | ○ | ○ | ○ |
| | LANE TRACKING CONTROL | ○ | ○ | × | ○ | × | ○ | × | ○ | ○ |
| | AUTO LANE CHANGE | ○ | × | × | × | × | × | × | × | × |
| | AUTO PASSING | ○ | × | × | × | × | × | × | × | × |
| | AUTO BRANCHING | ○ | × | × | × | × | × | × | ○ | × |
| | AUTO MERGING | ○ | × | × | × | × | × | × | ○ | × |
| VISION ASSIST FUNCTIONS | LANE DEPARTURE WARNING | × | ○ | × | ○ | × | ○ | × | ○ | ○ |
| | BLIND SPOT MONITORING | × | ○ | × | ○ | × | ○ | × | ○ | ○ |
| | VEHICLE PROXIMITY ALARM | × | ○ | × | ○ | × | ○ | × | ○ | ○ |
| | PEDESTRIAN PROXIMITY ALARM | × | × | × | × | × | × | × | × | × |
| | HI BEAM AUTO CHANGE | × | × | × | × | × | × | × | × | × |
| | HEADLIGHT AUTO DIRECTION CONTROL | × | × | ○ | × | × | × | × | × | × |
| | HEADLIGHT/FOGLIGHT AUTO TURN ON | × | ○ | ○ | ○ | × | ○ | ○ | × | × |
| | WIPER AUTO OPERATION | × | ○ | ○ | ○ | × | × | × | × | × |
| | DEFROSTER AUTO OPERATION | × | × | × | × | ○ | × | × | × | × |
| | NIGHT VIEW AUTO OPERATION | × | × | × | × | ○ | × | × | × | × |
| | PROVISION OF SURROUNDING SITUATION | × | × | × | × | × | × | × | × | × |
| CONGESTION ASSIST FUNCTIONS | AUTO START FROM STOP AT CONGESTION | × | × | × | × | × | × | × | × | × |
| | HAZARD LIGHT TEMPORARY TURN ON CONTROL | × | × | × | × | × | × | × | × | × |
| | AUTO SWITCH OF CIRCULATION OF INSIDE/OUTSIDE AIR OF AC | × | × | × | × | × | × | × | × | × |
| | CHANGE OF SEAT POSITION | × | × | × | × | × | × | × | × | × |
| | PROVISION OF CONGESTION INFORMATION | × | × | × | × | × | × | × | × | × |
| | DISPLAY OF MOVING IMAGE | × | × | × | × | × | × | × | × | × |
| | AUTO ADJUSTMENT OF AUDIO VOLUME | × | × | × | × | × | × | × | × | × |
| | JERK REDUCING RUNNING CONTROL | × | × | × | × | × | × | × | × | × |

FIG. 6

| | DRIVING ASSISTANCE OPERATIONS | DAY | NIGHT |
|---|---|---|---|
| RUNNING ASSIST FUNCTIONS | VEHICLE DISTANCE CONTROL | ○ | ○ |
| | LANE TRACKING CONTROL | ○ | ○ |
| | AUTO LANE CHANGE | ○ | ○ |
| | AUTO PASSING | ○ | ○ |
| | AUTO BRANCHING | ○ | ○ |
| | AUTO MERGING | ○ | ○ |
| VISION ASSIST FUNCTIONS | LANE DEPARTURE WARNING | × | × |
| | BLIND SPOT MONITORING | × | × |
| | VEHICLE PROXIMITY ALARM | × | × |
| | PEDESTRIAN PROXIMITY ALARM | × | × |
| | HI BEAM AUTO CHANGE | × | ○ |
| | HEADLIGHT AUTO DIRECTION CONTROL | × | ○ |
| | HEADLIGHT/FOGLIGHT AUTO TURN ON | × | × |
| | WIPER AUTO OPERATION | × | × |
| | DEFROSTER AUTO OPERATION | × | × |
| | NIGHT VIEW AUTO OPERATION | × | ○ |
| | PROVISION OF SURROUNDING SITUATION | × | × |
| CONGESTION ASSIST FUNCTIONS | AUTO START FROM STOP AT CONGESTION | × | × |
| | HAZARD LIGHT TEMPORARY TURN ON CONTROL | × | × |
| | AUTO SWITCH OF CIRCULATION OF INSIDE/OUTSIDE AIR OF AC | × | × |
| | CHANGE OF SEAT POSITION | × | × |
| | PROVISION OF CONGESTION INFORMATION | × | × |
| | DISPLAY OF MOVING IMAGE | × | × |
| | AUTO ADJUSTMENT OF AUDIO VOLUME | × | × |
| | JERK REDUCING RUNNING CONTROL | × | × |

FIG. 7

| | DRIVING ASSISTANCE OPERATIONS | GENERAL ROADS | TRUNK ROADS | INTER-CITY HIGHWAYS | CITY HIGHWAYS |
|---|---|---|---|---|---|
| RUNNING ASSIST FUNCTIONS | VEHICLE DISTANCE CONTROL | ○ | ○ | ○ | ○ |
| | LANE TRACKING CONTROL | ○ | ○ | ○ | ○ |
| | AUTO LANE CHANGE | × | ○ | ○ | ○ |
| | AUTO PASSING | × | × | ○ | ○ |
| | AUTO BRANCHING | × | × | ○ | ○ |
| | AUTO MERGING | × | × | ○ | ○ |
| VISION ASSIST FUNCTIONS | LANE DEPARTURE WARNING | ○ | ○ | ○ | ○ |
| | BLIND SPOT MONITORING | ○ | ○ | ○ | ○ |
| | VEHICLE PROXIMITY ALARM | ○ | ○ | ○ | ○ |
| | PEDESTRIAN PROXIMITY ALARM | ○ | × | × | × |
| | HI BEAM AUTO CHANGE | × | × | × | × |
| | HEADLIGHT AUTO DIRECTION CONTROL | × | × | × | × |
| | HEADLIGHT/FOGLIGHT AUTO TURN ON | × | × | × | × |
| | WIPER AUTO OPERATION | × | × | × | × |
| | DEFROSTER AUTO OPERATION | × | × | × | × |
| | NIGHT VIEW AUTO OPERATION | × | × | × | × |
| | PROVISION OF SURROUNDING SITUATION | × | × | × | ○ |
| CONGESTION ASSIST FUNCTIONS | AUTO START FROM STOP AT CONGESTION | × | × | × | × |
| | HAZARD LIGHT TEMPORARY TURN ON CONTROL | × | × | × | × |
| | AUTO SWITCH OF CIRCULATION OF INSIDE/OUTSIDE AIR OF AC | × | × | × | × |
| | CHANGE OF SEAT POSITION | × | × | × | × |
| | PROVISION OF CONGESTION INFORMATION | × | × | × | × |
| | DISPLAY OF MOVING IMAGE | × | × | × | × |
| | AUTO ADJUSTMENT OF AUDIO VOLUME | × | × | × | × |
| | JERK REDUCING RUNNING CONTROL | × | × | × | × |

FIG. 8

| | DRIVING ASSISTANCE OPERATIONS | CONGESTED | NOT CONGESTED |
|---|---|---|---|
| RUNNING ASSIST FUNCTIONS | VEHICLE DISTANCE CONTROL | ○ | ○ |
| | LANE TRACKING CONTROL | ○ | ○ |
| | AUTO LANE CHANGE | × | ○ |
| | AUTO PASSING | × | ○ |
| | AUTO BRANCHING | ○ | ○ |
| | AUTO MERGING | ○ | ○ |
| VISION ASSIST FUNCTIONS | LANE DEPARTURE WARNING | ○ | × |
| | BLIND SPOT MONITORING | ○ | × |
| | VEHICLE PROXIMITY ALARM | ○ | × |
| | PEDESTRIAN PROXIMITY ALARM | ○ | × |
| | HI BEAM AUTO CHANGE | ○ | × |
| | HEADLIGHT AUTO DIRECTION CONTROL | ○ | × |
| | HEADLIGHT/FOGLIGHT AUTO TURN ON | ○ | × |
| | WIPER AUTO OPERATION | ○ | × |
| | DEFROSTER AUTO OPERATION | ○ | × |
| | NIGHT VIEW AUTO OPERATION | ○ | × |
| | PROVISION OF SURROUNDING SITUATION | ○ | × |
| CONGESTION ASSIST FUNCTIONS | AUTO START FROM STOP AT CONGESTION | ○ | × |
| | HAZARD LIGHT TEMPORARY TURN ON CONTROL | ○ | × |
| | AUTO SWITCH OF CIRCULATION OF INSIDE/OUTSIDE AIR OF AC | ○ | × |
| | CHANGE OF SEAT POSITION | ○ | × |
| | PROVISION OF CONGESTION INFORMATION | ○ | × |
| | DISPLAY OF MOVING IMAGE | ○ | × |
| | AUTO ADJUSTMENT OF AUDIO VOLUME | ○ | × |
| | JERK REDUCING RUNNING CONTROL | ○ | × |

FIG. 9

| | DRIVING ASSISTANCE OPERATIONS | SLEEPY | TIRED | OVERWORKED | DISTRACTED | NORMAL |
|---|---|---|---|---|---|---|
| RUNNING ASSIST FUNCTIONS | VEHICLE DISTANCE CONTROL | ○ | ○ | ○ | ○ | ○ |
| | LANE TRACKING CONTROL | ○ | ○ | ○ | ○ | ○ |
| | AUTO LANE CHANGE | × | ○ | × | × | ○ |
| | AUTO PASSING | × | ○ | × | × | ○ |
| | AUTO BRANCHING | ○ | × | ○ | × | ○ |
| | AUTO MERGING | ○ | × | × | × | ○ |
| VISION ASSIST FUNCTIONS | LANE DEPARTURE WARNING | × | × | × | × | × |
| | BLIND SPOT MONITORING | × | × | × | × | × |
| | VEHICLE PROXIMITY ALARM | × | × | × | × | × |
| | PEDESTRIAN PROXIMITY ALARM | × | × | × | × | × |
| | HI BEAM AUTO CHANGE | × | × | × | × | × |
| | HEADLIGHT AUTO DIRECTION CONTROL | × | × | × | × | × |
| | HEADLIGHT/FOGLIGHT AUTO TURN ON | × | × | × | × | × |
| | WIPER AUTO OPERATION | × | × | × | × | × |
| | DEFROSTER AUTO OPERATION | × | × | × | × | × |
| | NIGHT VIEW AUTO OPERATION | × | × | × | × | × |
| | PROVISION OF SURROUNDING SITUATION | × | × | × | × | × |
| CONGESTION ASSIST FUNCTIONS | AUTO START FROM STOP AT CONGESTION | × | × | × | × | × |
| | HAZARD LIGHT TEMPORARY TURN ON CONTROL | × | × | × | × | × |
| | AUTO SWITCH OF CIRCULATION OF INSIDE/OUTSIDE AIR OF AC | × | × | × | × | × |
| | CHANGE OF SEAT POSITION | × | × | × | × | × |
| | PROVISION OF CONGESTION INFORMATION | × | × | × | × | × |
| | DISPLAY OF MOVING IMAGE | × | × | × | × | × |
| | AUTO ADJUSTMENT OF AUDIO VOLUME | × | × | × | × | × |
| | JERK REDUCING RUNNING CONTROL | × | × | × | × | × |

FIG. 10

| | DRIVING ASSISTANCE OPERATIONS | UNSTABLE | STABLE |
|---|---|---|---|
| RUNNING ASSIST FUNCTIONS | VEHICLE DISTANCE CONTROL | ○ | ○ |
| | LANE TRACKING CONTROL | ○ | ○ |
| | AUTO LANE CHANGE | × | ○ |
| | AUTO PASSING | × | ○ |
| | AUTO BRANCHING | × | ○ |
| | AUTO MERGING | × | ○ |
| VISION ASSIST FUNCTIONS | LANE DEPARTURE WARNING | × | × |
| | BLIND SPOT MONITORING | × | × |
| | VEHICLE PROXIMITY ALARM | × | × |
| | PEDESTRIAN PROXIMITY ALARM | × | × |
| | HI BEAM AUTO CHANGE | × | × |
| | HEADLIGHT AUTO DIRECTION CONTROL | × | × |
| | HEADLIGHT/FOGLIGHT AUTO TURN ON | × | × |
| | WIPER AUTO OPERATION | × | × |
| | DEFROSTER AUTO OPERATION | × | × |
| | NIGHT VIEW AUTO OPERATION | × | × |
| | PROVISION OF SURROUNDING SITUATION | × | × |
| CONGESTION ASSIST FUNCTIONS | AUTO START FROM STOP AT CONGESTION | × | × |
| | HAZARD LIGHT TEMPORARY TURN ON CONTROL | × | × |
| | AUTO SWITCH OF CIRCULATION OF INSIDE/OUTSIDE AIR OF AC | × | × |
| | CHANGE OF SEAT POSITION | × | × |
| | PROVISION OF CONGESTION INFORMATION | × | × |
| | DISPLAY OF MOVING IMAGE | × | × |
| | AUTO ADJUSTMENT OF AUDIO VOLUME | × | × |
| | JERK REDUCING RUNNING CONTROL | × | × |

FIG. 12

| DRIVING ASSISTANCE OPERATIONS | | DAY | NIGHT | INTERCITY HIGHWAYS | NON-CONGESTION | TIRED | STABLE | COMBINED RESULTS |
|---|---|---|---|---|---|---|---|---|
| RUNNING ASSIST FUNCTIONS | VEHICLE DISTANCE CONTROL | O | O | O | O | O | O | O |
| | LANE TRACKING CONTROL | O | O | O | O | O | O | O |
| | AUTO LANE CHANGE | O | O | O | O | O | O | O |
| | AUTO PASSING | O | O | O | O | O | O | O |
| | AUTO BRANCHING | O | O | O | O | x | O | x |
| | AUTO MERGING | O | O | O | O | x | O | x |
| VISION ASSIST FUNCTIONS | LANE DEPARTURE WARNING | x | x | O | O | x | x | O |
| | BLIND SPOT MONITORING | x | x | O | O | x | x | O |
| | VEHICLE PROXIMITY ALARM | x | x | O | O | x | x | O |
| | PEDESTRIAN PROXIMITY ALARM | x | x | O | O | x | x | O |
| | HI BEAM AUTO CHANGE | x | O | x | x | x | x | O |
| | HEADLIGHT AUTO DIRECTION CONTROL | x | O | x | x | x | x | x |
| | HEADLIGHT/FOGLIGHT AUTO TURN ON | x | x | x | x | x | x | x |
| | WIPER AUTO OPERATION | x | x | x | x | x | x | x |
| | DEFROSTER AUTO OPERATION | x | x | x | x | x | x | x |
| | NIGHT VIEW AUTO OPERATION | x | O | x | x | x | x | O |
| | PROVISION OF SURROUNDING SITUATION | x | x | x | x | x | x | x |
| CONGESTION ASSIST FUNCTIONS | AUTO START FROM STOP AT CONGESTION | x | x | x | x | x | x | x |
| | HAZARD LIGHT TEMPORARY TURN ON CONTROL | x | x | x | x | x | x | x |
| | AUTO SWITCH OF CIRCULATION OF INSIDE/OUTSIDE AIR OF AC | x | x | x | x | x | x | x |
| | CHANGE OF SEAT POSITION | x | x | x | x | x | x | x |
| | PROVISION OF CONGESTION INFORMATION | x | x | x | x | x | x | x |
| | DISPLAY OF MOVING IMAGE | x | x | x | x | x | x | x |
| | AUTO ADJUSTMENT OF AUDIO VOLUME | x | x | x | x | x | x | x |
| | JERK REDUCING RUNNING CONTROL | x | x | x | x | x | x | x |

FIG. 13

| | DRIVING ASSISTANCE OPERATIONS | CAND.1 | CAND.2 | CAND.3 | CAND.4 | CAND.5 | CAND.6 | CAND.7 | CAND.8 | CAND.9 |
|---|---|---|---|---|---|---|---|---|---|---|
| RUNNING ASSIST FUNCTIONS | VEHICLE DISTANCE CONTROL | ○ | ○ | ○ | × | ○ | ○ | × | ○ | × |
| | LANE TRACKING CONTROL | ○ | ○ | × | ○ | × | × | ○ | × | ○ |
| | AUTO LANE CHANGE | ○ | ○ | ○ | ○ | × | ○ | ○ | × | × |
| | AUTO PASSING | ○ | × | ○ | ○ | × | × | × | × | × |
| | AUTO BRANCHING | × | × | × | × | × | × | × | × | × |
| | AUTO MERGING | × | × | × | × | × | × | × | × | × |
| VISION ASSIST FUNCTIONS | LANE DEPARTURE WARNING | ○ | ○ | ○ | ○ | ○ | ○ | ○ | ○ | ○ |
| | BLIND SPOT MONITORING | ○ | ○ | ○ | ○ | ○ | ○ | ○ | ○ | ○ |
| | VEHICLE PROXIMITY ALARM | ○ | ○ | ○ | ○ | ○ | ○ | ○ | ○ | ○ |
| | PEDESTRIAN PROXIMITY ALARM | ○ | ○ | ○ | ○ | ○ | ○ | ○ | ○ | ○ |
| | HI BEAM AUTO CHANGE | ○ | ○ | ○ | × | ○ | ○ | ○ | × | × |
| | HEADLIGHT AUTO DIRECTION CONTROL | × | × | × | × | × | ○ | ○ | × | × |
| | HEADLIGHT/FOGLIGHT AUTO TURN ON | ○ | ○ | ○ | ○ | ○ | ○ | ○ | ○ | ○ |
| | WIPER AUTO OPERATION | × | × | × | × | × | × | × | × | × |
| | DEFROSTER AUTO OPERATION | × | × | × | × | × | × | × | × | × |
| | NIGHT VIEW AUTO OPERATION | × | × | × | × | × | × | × | × | × |
| | PROVISION OF SURROUNDING SITUATION | × | × | × | × | × | × | × | × | × |
| CONGESTION ASSIST FUNCTIONS | AUTO START FROM STOP AT CONGESTION | × | × | × | × | × | × | × | × | × |
| | HAZARD LIGHT TEMPORARY TURN ON CONTROL | × | × | × | × | × | × | × | × | × |
| | AUTO SWITCH OF CIRCULATION OF INSIDE/OUTSIDE AIR OF AC | × | × | × | × | × | × | × | × | × |
| | CHANGE OF SEAT POSITION | × | × | × | × | × | × | × | × | × |
| | PROVISION OF CONGESTION INFORMATION | × | × | × | × | × | × | × | × | × |
| | DISPLAY OF MOVING IMAGE | × | × | × | × | × | × | × | × | × |
| | AUTO ADJUSTMENT OF AUDIO VOLUME | × | × | × | × | × | × | × | × | × |
| | JERK REDUCING RUNNING CONTROL | × | × | × | × | × | × | × | × | × |
| | PRIORITY ORDER IN CASE WHERE AUTO-TRACKING IS NOT DESIRABLE | 7 | 1 | 8 | 9 | 2 | 3 | 4 | 5 | 6 |
| | PRIORITY ORDER IN CASE WHERE AUTO LANE CHANGE IS DESIRABLE | 1 | 2 | 3 | 4 | 7 | 5 | 6 | 8 | 9 |
| | PRIORITY ORDER IN OTHER CASES | 1 | 2 | 3 | 4 | 5 | 6 | 7 | 8 | 9 |

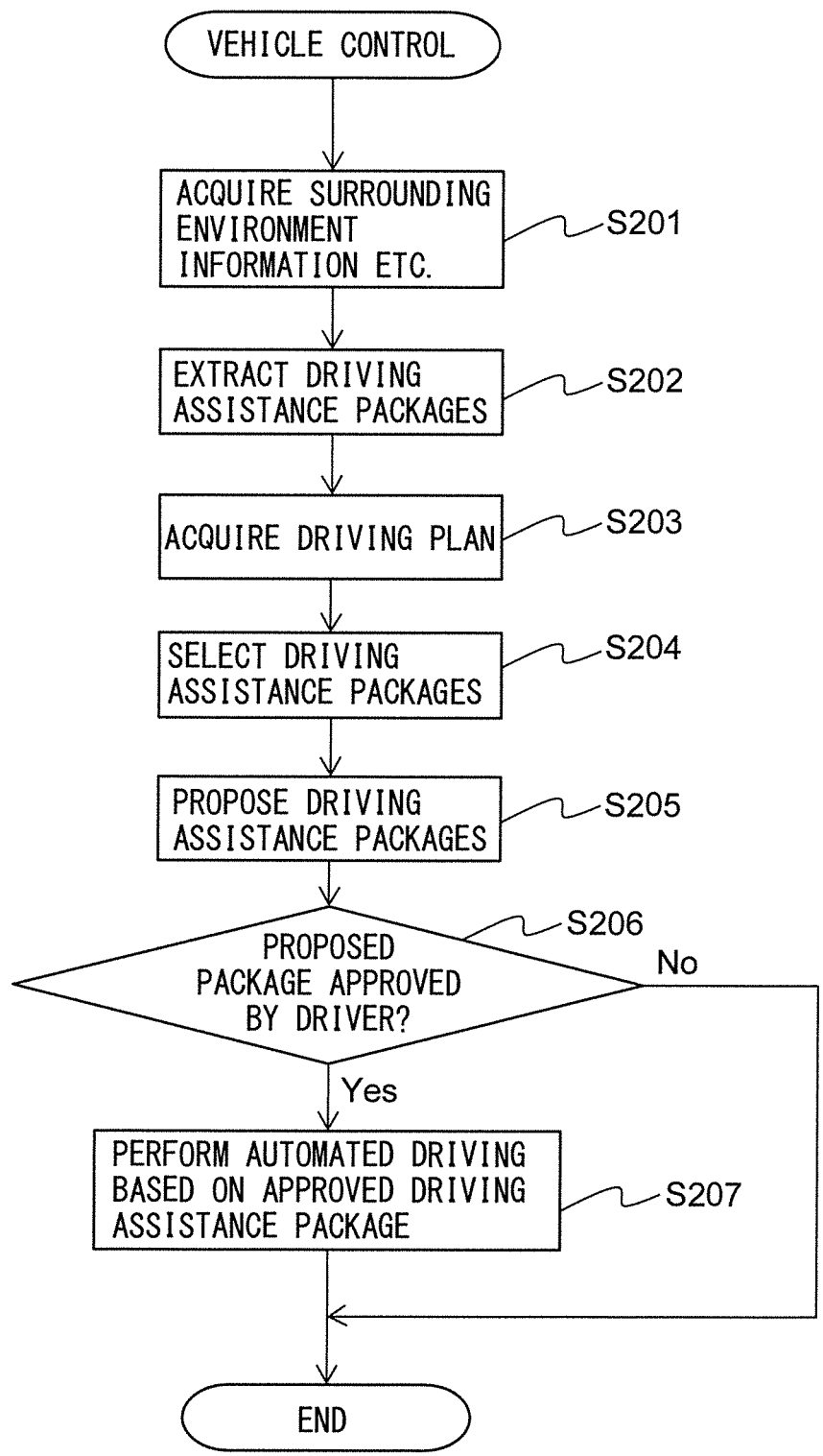

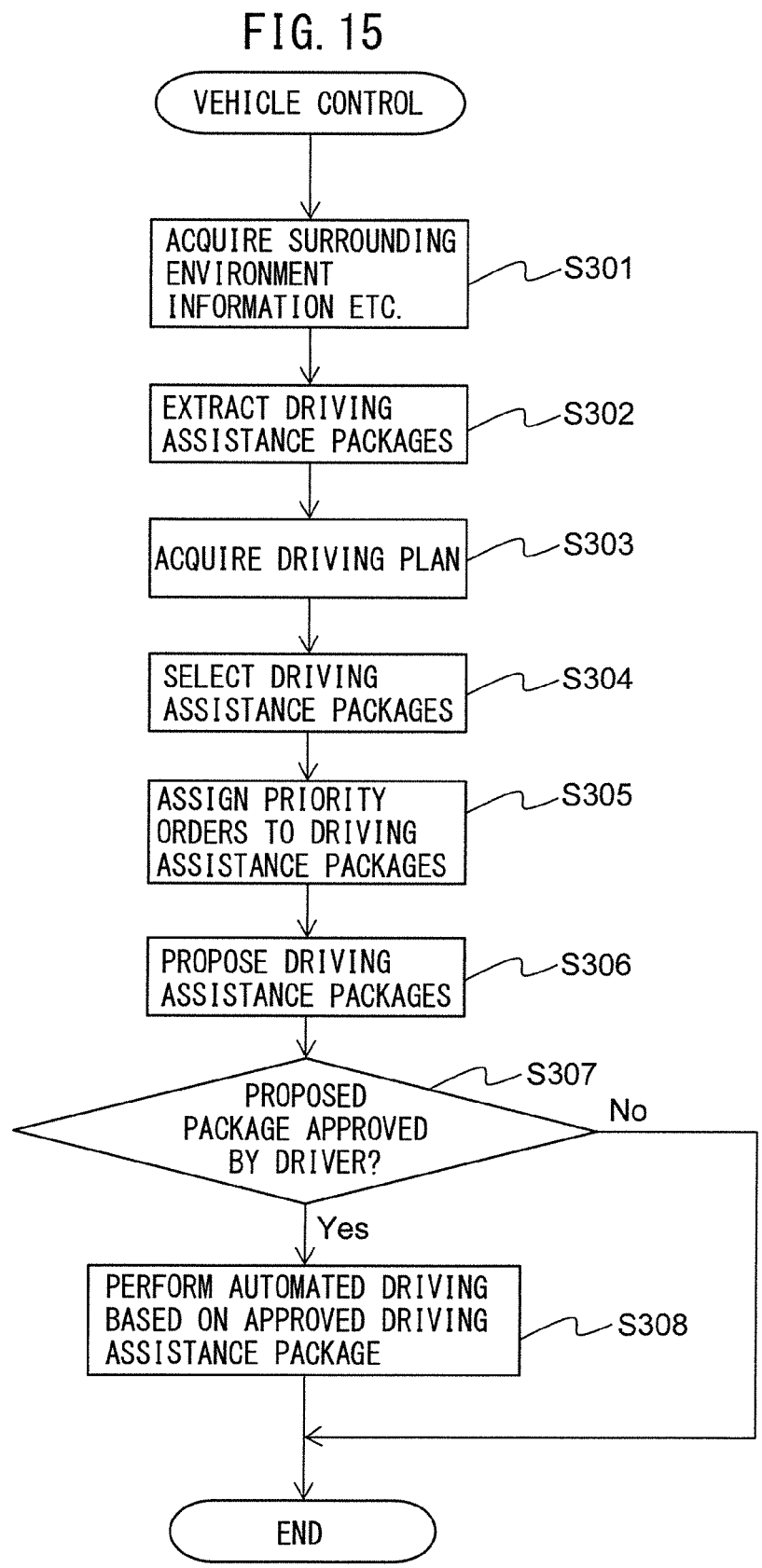

CONTROL DEVICE OF VEHICLE

CROSS-REFERENCE TO RELATED APPLICATIONS

This application claims priority to Japanese Patent Application No. 2016-131861 filed on Jul. 1, 2016, the entire contents of which are hereby incorporated by reference.

TECHNICAL FIELD

The present disclosure relates to a control device of a vehicle.

BACKGROUND ART

U.S. Pat. No. 8,670,891 discloses a conventional vehicle automated driving system wherein when a driver operates a switch to change from a manual driving mode to an automated driving mode, automated driving is performed including vehicle distance control, lane tracking control, and other various driving assistance operations performed automatically.

SUMMARY

However, the above-mentioned conventional control device of a vehicle judged that the driver gave permission for execution of all driving assistance operations by the switching to the automated driving mode. For this reason, the driver was only able to perform an operation for switching from the manual driving mode to the automated driving mode when shifting to automated driving and was not able to freely set permission for the individual driving assistance operations. However, in order to keep driving assistance operations not required by the driver from being performed, it is desirable that the driver can freely set permissions for the individual driving assistance operations in automated driving.

On the other hand, if a driver could freely set permissions for individual driving assistance operations in automated driving, the operation for setting these by the driver would become troublesome. Further, in bad weather and other certain surrounding environmental conditions, it is difficult for some driving assistance operations to be performed. Further, when performing automated driving, a driving plan of automated driving is generated. The suitable driving assistance operations differ depending on the driving plan.

Therefore, an object of the present disclosure is to provide a control device of a vehicle enabling permissions for individual driving assistance operations in automated driving to be suitably and easily set by a driver.

Solution to Problem

In order to solve the above problem, in a first aspect, there is provided a control device of a vehicle for controlling a vehicle comprising: a surrounding environment information acquiring device configured to acquire surrounding environment information relating to surrounding environment conditions of a host vehicle; a vehicle information acquiring device configured to acquire vehicle information relating to conditions of the host vehicle; and a driver information acquiring device configured to acquire driver information relating to conditions of a driver of the host vehicle, the control device of a vehicle comprising: a driving plan generating part configured to generate a driving plan in automated driving of the host vehicle; a package extracting part configured to extract driving assistance packages packaging permissions for a plurality of driving assistance operations based on at least one of the surrounding environment information, the vehicle information, and the driver information; a package proposing part configured to propose driving assistance packages to the driver of the host vehicle based on the driving assistance packages extracted by the package extracting part and the driving plan; and an automated driving executing part configured to perform driving assistance operations permitted in a driving assistance package proposed by the package proposing part and approved by the driver of the host vehicle.

In a second aspect, the package proposing part is configured to propose driving assistance packages extracted by the package extracting part to the driver of the host vehicle while assigning priority orders based on the driving plan, in the first aspect.

In a third aspect, the package proposing part is configured to select driving assistance packages to be proposed to the driver of the host vehicle from among the driving assistance packages extracted by the package extracting part based on the driving plan, in the first aspect.

In a forth aspect, the package proposing part is configured to select driving assistance packages to be proposed to the driver of the host vehicle from among the driving assistance packages extracted by the package extracting part based on the driving plan, and propose the selected driving assistance packages to the driver of the host vehicle while assigning priority orders based on the driving plan, in the first aspect.

According to the present disclosure, there is provided a control device of a vehicle enabling permissions for individual driving assistance operations in automated driving to be suitably and easily set by a driver.

BRIEF DESCRIPTION OF DRAWINGS

FIG. 4 is a view showing a list of driving assistance operations performed during an automated driving mode by an automated driving system.

FIG. 5 is a view showing a group of packages relating to weather conditions.

FIG. 6 is a view showing a group of packages relating to sunlight conditions.

FIG. 7 is a view showing a group of packages relating to road types.

FIG. 8 is a view showing a group of packages relating to road conditions.

FIG. 9 is a view showing a group of packages relating to driver conditions.

FIG. 10 is a view showing a group of packages relating to host vehicle conditions.

FIG. 12 is a view showing an example of the results of determination of driving assistance operations able to be executed by combining unit packages.

FIG. 13 is a view showing driving assistance packages extracted based on the results of combinations shown in FIG. 12.

FIG. 14 is a flow chart showing a control routine of vehicle control in the second embodiment of the present disclosure.

FIG. 15 is a flow chart showing a control routine of vehicle control in a third embodiment of the present disclosure.

DESCRIPTION OF EMBODIMENT

Figure 1:
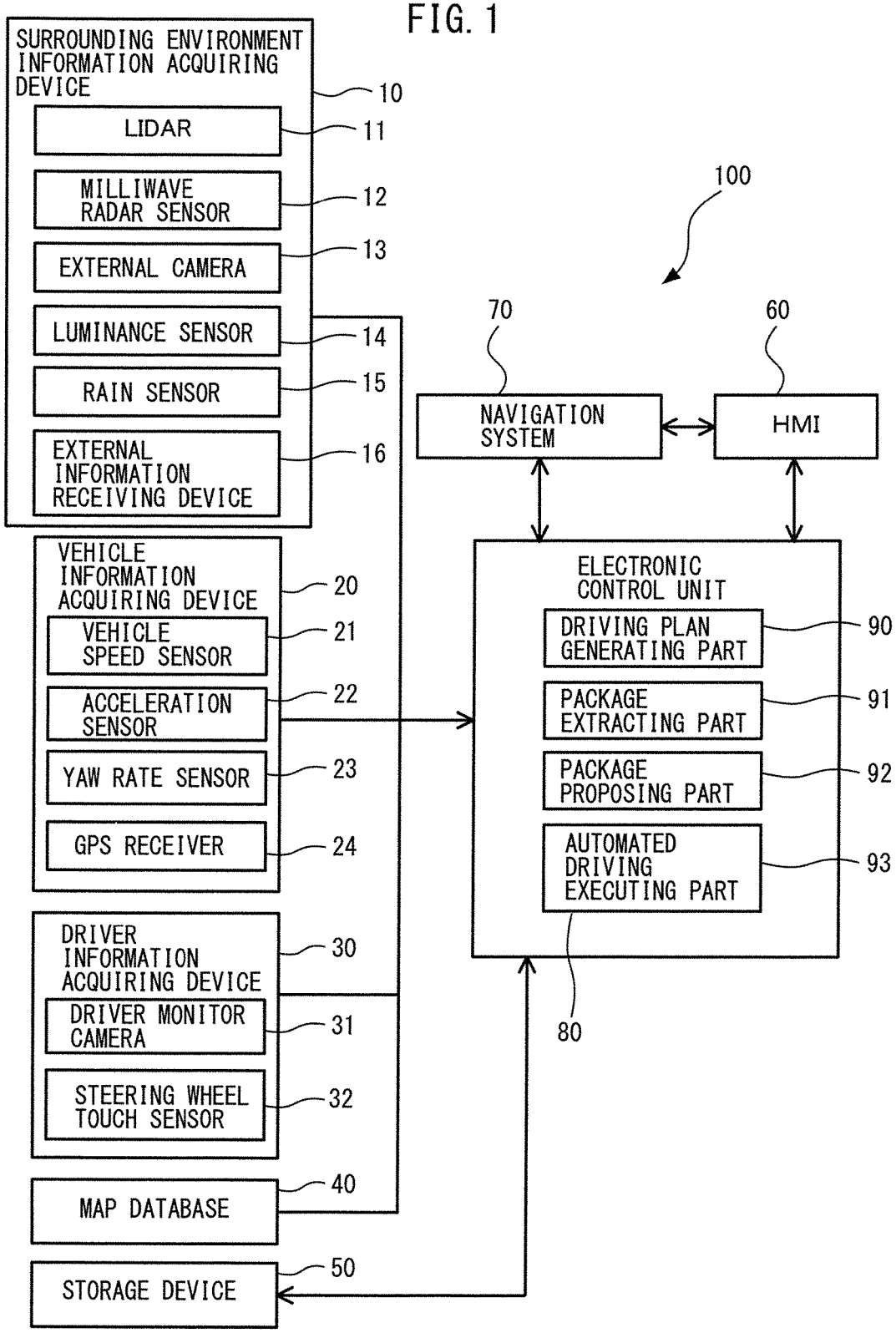
FIG. 1 is a block diagram showing the configuration of a vehicle automated driving system according to a first embodiment of the present disclosure.

Below, referring to the drawings, embodiments of the present disclosure will be explained in detail. Note that, in the following explanation, similar components are assigned the same reference notations.

First Embodiment

First, referring to FIG. 1 to FIG. 13, a first embodiment of the present disclosure will be explained.

<Configuration of Automated Driving System>

Figure 2:
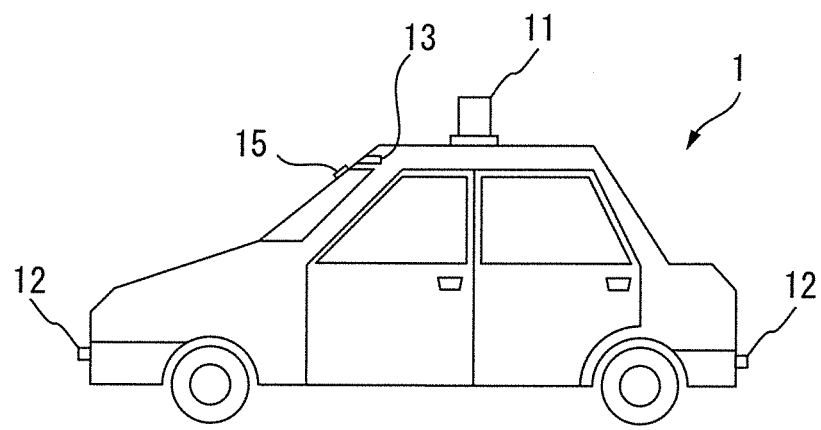
FIG. 2 is a schematic side view of a vehicle carrying an automated driving system.
Figure 3:
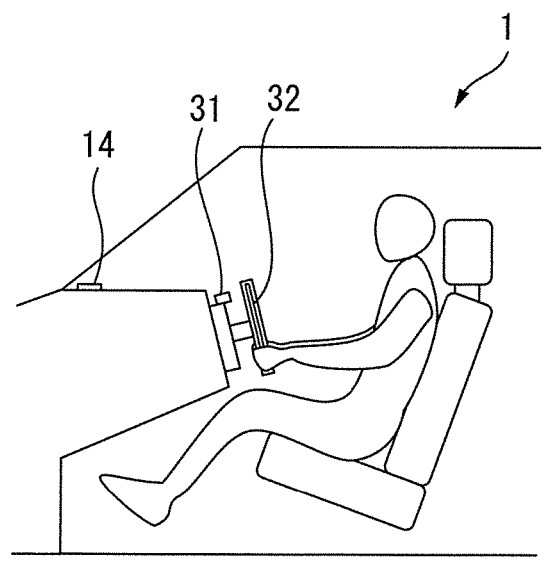
FIG. 3 is a view schematically showing the inside of a vehicle carrying an automated driving system.

FIG. 1 is a block diagram showing the configuration of a vehicle automated driving system 100 according to the first embodiment of the present disclosure. FIG. 2 is a schematic side view of a vehicle 1 equipped with an automated driving system 100. FIG. 3 is a view schematically showing the inside of a vehicle 1 equipped with an automated driving system 100.

As shown in FIG. 1, the automated driving system 100 is provided with a surrounding environment information acquiring device 10, vehicle information acquiring device 20, driver information acquiring device 30, map database 40, storage device 50, human machine interface (HMI) 60, navigation system 70, and electronic control unit (ECU) 80.

The surrounding environment information acquiring device 10 acquires surrounding environment information relating to the conditions of the surrounding environment of the vehicle 1 (host vehicle). The surrounding environment information includes the weather, the road on which the vehicle 1 is running, obstacles around the vehicle 1 (curbs, buildings, other vehicles, pedestrians, fallen objects, etc.) and other information. The surrounding environment information acquiring device 10 is provided with a LIDAR (laser imaging detection and ranging device) 11, milliwave radar sensors 12, an outside camera 13, a luminance sensor 14, a rain sensor 15, and an external information receiving apparatus 16.

The LIDAR 11 uses laser light to detect the road and obstacles in the surroundings of the vehicle 1. As shown in FIG. 2, in the present embodiment, the LIDAR 11 is attached to the roof of the vehicle 1. The LIDAR 11 successively irradiates laser light toward the entire surroundings of the vehicle 1 and measures the distances to the road and obstacles from the reflected light. The LIDAR 11 generates 3D images of the road and obstacles in the entire surroundings of the vehicle 1 based on the measurement results, and transmits the generated 3D image information as surrounding environment information to the electronic control unit 80.

Note that, the positions where the LIDAR 11 is attached to the vehicle 1 is not limited to the position shown in FIG. 2 so long as a position enabling the necessary surrounding environment information to be acquired. For example, the LIDAR 11 may be attached to the front bumper, rear bumper, or grille or the insides of the vehicle lights (for example headlights or brake lights) or the chassis part (frame) of the vehicle 1.

The milliwave radar sensors 12 use electrical waves to detect obstacles around the vehicle 1 over a further distance than the LIDAR 11. As shown in FIG. 2, in the present embodiment, the milliwave radar sensors 12 are attached to the front bumper and rear bumper of the vehicle 1. The milliwave radar sensors 12 emit electrical waves to the surroundings of the vehicle 1 (in the present embodiment, to the front, rear, and sides of the vehicle 1) and measure the distances to obstacles in the surroundings of the vehicle 1 and relative speeds with the obstacles from the reflected waves. The milliwave radar sensors 12 transmit the results of measurement as surrounding environment information to the electronic control unit 80.

Note that, the positions where the milliwave radar sensors 12 are attached to the vehicle 1 are not limited to the positions shown in FIG. 2 so long as positions enabling the necessary surrounding environment information to be acquired. For example, the milliwave radar sensors 12 may be attached to the grilles of the vehicle 1, the insides of the vehicle lights (for example headlights or brake lights) or the chassis part (frame) of the vehicle 1.

The outside camera 13 captures an image of the field in front of the vehicle 1. As shown in FIG. 2, in the present embodiment, the outside camera 13 is attached to the center of the front end of the roof of the vehicle 1. The outside camera 13 performs image processing of the captured image to detect information on obstacles in front of the vehicle 1, traffic information in the surroundings of the vehicle 1 (lane width, road shape, road signs, white lines, statuses of traffic lights, etc.), the yaw angle (relative direction of vehicle 1 to running lane), running information of vehicle 1 (for example, offset of vehicle 1 from center of running lane), meteorological information in the surroundings of vehicle 1 (information on rain, snow, fog, etc.), etc. The outside camera 13 transmits the detected information as surrounding environment information to the electronic control unit 80.

Note that, the position where the outside camera 13 is mounted at the vehicle 1 is not limited to the position shown in FIG. 2 so long as a position able to capture an image of the field in front of the vehicle 1. For example, the outside camera 13 may be attached to the top center of the back surface of the windshield at the inside of the vehicle 1.

The luminance sensor 14 detects the luminance of the surroundings of the vehicle 1. As shown in FIG. 2, in the present embodiment, the luminance sensor 14 is attached to the top surface of an instrument panel in the vehicle 1. The luminance sensor 14 transmits the detected luminance information of the surroundings of the vehicle 1 as surrounding environment information to the electronic control unit 80. Note that, the position where the luminance sensor 14 is mounted at the vehicle 1 may be a position different from the position shown in FIG. 3.

The rain sensor 15 detects the presence of rainfall and the amount of rainfall. As shown in FIG. 2, in the present embodiment, the rain sensor 15 is attached to the top center of the front surface of the windshield of the vehicle 1. The rain sensor 15 emits light generated from a built-in light emitting diode toward the front surface of the windshield and measures the change of the reflected light at that time so as to detect rainfall information such as the presence of rainfall and the amount of rainfall. The rain sensor 15 transmits the detected rainfall information as surrounding environment information to the electronic control unit 80.

Note that, the position where the rain sensor 15 is attached to the vehicle 1 may be a position different from the position shown in FIG. 2.

The external information receiving apparatus 16 receives, for example, congestion information and meteorological information (weather, air temperature, wind speed, and other information) and other such external information sent from a road traffic information communication system center or other external communication center. The external information receiving apparatus 16 transmits the received external information as surrounding environment information to the electronic control unit 80.

The vehicle information acquiring device 20 acquires vehicle information relating to the conditions of the vehicle 1 (host vehicle). The vehicle information includes the speed, acceleration, posture, current position, and other information of the vehicle 1. As shown in FIG. 1, the vehicle information acquiring device 20 is provided with a speed sensor 21, an acceleration sensor 22, a yaw rate sensor 23, and a GPS receiver 24.

The speed sensor 21 detects the speed of the vehicle 1. The speed sensor 21 transmits the detected speed of the vehicle 1 as vehicle information to the electronic control unit 80.

The acceleration sensor 22 detects the acceleration of the vehicle 1 at the time of acceleration and the time of braking. The acceleration sensor 22 transmits the detected acceleration of the vehicle 1 as vehicle information to the electronic control unit 80.

The yaw rate sensor 23 detects the posture of the vehicle 1. Specifically, the yaw rate sensor 23 detects the speed of change of the yaw angle at the time of turning of the vehicle 1, that is, the rotational angle speed (yaw rate) around the vertical axis of the vehicle 1. The yaw rate sensor 23 transmits the detected posture of the vehicle 1 as vehicle information to the electronic control unit 80.

The GPS receiver 24 receives signals from three or more GPS satellites, identifies the latitude and longitude of the vehicle 1, and detects the current position of the vehicle 1. The GPS receiver 24 transmits the detected current position of the vehicle 1 as vehicle information to the electronic control unit 80.

The driver information acquiring device 30 acquires driver information relating to the conditions of the driver of the vehicle 1 (host vehicle). The driver information includes the facial expression, posture, etc. of the driver. As shown in FIG. 1, the driver information acquiring device 30 is provided with a driver monitor camera 31 and a steering wheel touch sensor 32.

The driver monitor camera 31 captures an image of the appearance of the driver. As shown in FIG. 3, in the present embodiment, the driver monitor camera 31 is attached to the top surface of a steering wheel column cover. The driver monitor camera 31 performs image processing of the captured image of the driver so as to detect the facial expression of the driver (direction of face of driver, line of sight, degree of opening of eyes, etc.), posture, and other appearance information of the driver. The driver monitor camera 31 transmits the detected appearance information of the driver as driver information to the electronic control unit 80. Note that, the position at which the driver monitor camera 31 is attached to the vehicle 1 may be a position different from the position shown in FIG. 3.

The steering wheel touch sensor 32 detects if the driver is gripping the steering wheel. As shown in FIG. 3, the steering wheel touch sensor 32 is attached to the steering wheel. The steering wheel touch sensor 32 transmits the detected gripping information of the steering wheel as driver information to the electronic control unit 80. Note that, the position at which the steering wheel touch sensor 32 is attached to the vehicle 1 may be a position different from the position shown in FIG. 3.

The map database 40 is a database relating to map information. The map database 40 is, for example, stored in a hard disk drive (HDD) carried in the vehicle 1. The map information includes position information of the road, shape information of the road (for example, differentiation between curves and straight parts, curvature of curves, etc.), position information of intersections and junctions, road types, and other information.

The storage device 50 stores automated driving road maps. The automated driving road maps are prepared by the electronic control unit 80 based on the 3D image generated by the LIDAR 11. The electronic control unit 80 updates the automated driving road maps constantly or periodically.

The HMI 60 is an interface for input and output of information between the driver or vehicle passenger and the automated driving system 100. The HMI 60, for example, includes a display displaying text or image information, a speaker generating sound, operating buttons for the driver or vehicle passenger to input operations, a touch panel, a microphone, etc.

The navigation system 70 guides the vehicle 1 to a destination set by the driver through the HMI 60. The navigation system 70 calculates the target route to the target destination based on the current position information of the vehicle 1 detected by the GPS receiver 24 and the map information of the map database 40. The navigation system 70 transmits the calculated information relating to the target route as navigation information to the electronic control unit 80.

The electronic control unit 80 is a microcomputer provided with components connected with each other by bidirectional buses such as a center processing unit (CPU), read only memory (ROM), random access memory (RAM), input port, and output port. The electronic control unit 80 outputs control signals for controlling various actuators for performing individual driving assistance operations from the output port to control the vehicle 1 based on surrounding environment information, vehicle information, driver information, navigation information, and other various information required for automated driving, which are input to the electronic control unit 80. Accordingly, the electronic control unit 80 functions as a control device of a vehicle.

<Explanation of Driving Assistance Operations in Automated Driving>

FIG. 4 is a view showing a list of driving assistance operations performed in the automated driving mode by the automated driving system 100 in the present embodiment. In the present embodiment, the driving assistance operations are roughly divided into three groups of functions of running assistance functions, vision assistance functions, and congestion assistance functions.

The driving assistance operations grouped together in the section of running assistance functions are driving assistance operations having functions for performing at least one of acceleration, steering, and braking (running assistance functions). In the present embodiment, as driving assistance operations having running assistance functions, vehicle distance control, lane tracking control, auto lane change, auto passing, auto branching, and auto merging may be mentioned. However, the types and numbers of the driving assistance operations having running assistance functions may differ from those shown in FIG. 4.

Note that, "vehicle distance control" is control automatically adjusting the vehicle speed within the range of a limit speed so as to be able to maintain a suitable vehicle distance corresponding to the vehicle speed while tracking a preceding vehicle in response to the change of vehicle speed of the preceding vehicle. "Lane tracking control" is control automatically adjusting the steering amount or vehicle speed so that the vehicle 1 runs on a suitable running line corresponding to the lane width of the running lane.

The driving assistance operations grouped together in the section of vision assistance functions are driving assistance operations having functions of securing the field of vision of the driver and in turn safety (vision assistance functions) among driving assistance operations not having running assistance functions (that is, not performing any of acceleration, steering, and braking). In the present embodiment, as driving assistance operations having vision assistance functions, lane departure warning, blind spot monitoring, and other of eleven driving assistance operations may be illustrated. However, the types and numbers of the driving assistance operations having vision assistance functions may differ from those shown in FIG. 4.

The driving assistance operations grouped together in the section of congestion assistance functions are driving assistance operations having functions of easing fatigue of the driver and vehicle passengers at the time of congestion (congestion assistance functions). In the present embodiment, as driving assistance operations having congestion assistance functions, auto start from stopping at the time of congestion and control for temporarily turning on the hazard light and other of eight driving assistance operations may be illustrated. However, the types and numbers of the driving assistance operations having congestion assistance functions may differ from those shown in FIG. 4.

In this regard, it is preferable for the driver to be able to freely set permissions for individual driving assistance operations before the start of automated driving and during automated driving so that driving assistance operations not required by the driver are not automatically performed at the time of automated driving. On the other hand, if the driver sets permissions for individual driving assistance operations at automated driving one at a time, the operation by the driver for setting the system would become troublesome and in turn the convenience of automated driving would fall. Further, the conditions of the surrounding environment, conditions of the host vehicle, and conditions of the driver change at each instant while the vehicle is running. Situations arise where some driving assistance operations become difficult (for example, poor weather etc.). Further, when an automated driving is performed, a driving plan for the automated driving is generated. However, suitable driving assistance operations differ depending on the driving plan.

<Explanation of Driving Assistance Packages>

Therefore, in the present embodiment, driving assistance packages which package permissions for pluralities of driving assistance operations are extracted based on at least one of the surrounding environment information, host vehicle information and driver information, and driving assistance packages are proposed to the driver based on the extracted driving assistance packages and the driving plan in automated driving of the host vehicle.

In the present embodiment, first, unit packages suitable for the weather conditions, sunlight conditions, road types, road conditions, driver conditions, and host vehicle conditions are selected from the groups of packages shown in FIG. 5 to FIG. 10, and driving assistance operations able to be performed by combining the selected unit packages are determined.

Below, referring to FIG. 5 to FIG. 10, the groups of packages will be explained. Note that, in FIG. 5 to FIG. 10, the O marks show permission to perform the driving assistance operations, while the X marks show no permission to perform the driving assistance operations. Further, the groups of packages are stored in the ROM of the electronic control unit 80.

FIG. 5 is a view showing the group of packages relating to the conditions of the weather. The group of packages relating to the weather conditions roughly divides weather conditions into the nine conditions of "clear", "rain", "heavy rain", "snow", "heavy snow", "fog", "thick fog", "wind", and "strong wind" and packages permissions for individual driving assistance operations for each of the weather conditions. For this reason, the group of packages relating to the weather conditions includes nine unit packages. In the present embodiment, the weather conditions during automated driving are specified based on the meteorological information around the vehicle 1 detected by the outside camera 13 and the meteorological information included in external information received by the external information receiving apparatus 16.

FIG. 6 is a view showing the group of packages relating to the conditions of sunlight. The group of packages relating to the sunlight conditions roughly divides sunlight conditions into "day" and "night" and packages permissions for individual driving assistance operations for each of the sunlight conditions. For this reason, the group of packages relating to the sunlight conditions includes two unit packages. In the present embodiment, the sunlight conditions during automated driving are specified based on the luminance information detected by the luminance sensor 14 and the time of day.

FIG. 7 is a view showing the group of packages relating to the types of the road. The group of packages relating to the road type roughly divides road types into the four types of "general roads", "trunk roads", "inter-city highways" (Tokyo-Nagoya highway, Nagoya-Kobe highway, etc.), and "city highways" (Tokyo metropolitan highway and Osaka-Kobe highway etc.) and packages permissions for individual driving assistance operations for each of the road types. For this reason, the group of packages relating to the road types includes four unit packages. In the present embodiment, the road type during automated driving is specified based on the traffic information around the vehicle 1 detected by the outside camera 13 and the road type information contained in the map information of the map database 40.

FIG. 8 is a view showing the group of packages relating to the conditions of the road. The group of packages relating to the road conditions roughly divides the road conditions into congested and noncongested and packages permissions for individual driving assistance operations for each of the road conditions. For this reason, the group of packages relating to the road conditions includes two unit packages. In the present embodiment, the road conditions during automated driving are specified based on the information of the 3D image generated by the LIDAR 11, the surrounding environment information detected by the milliwave radar sensors 12, the information on obstacles in front of the vehicle 1 detected by the outside camera 13 and traffic information around the vehicle 1, the congestion information included in the external information received by the external information receiving apparatus 16, and the speed of the vehicle 1 detected by the speed sensor 21.

Note that, in the present embodiment, "congested" means a condition where there is another vehicle around the vehicle 1 (preceding vehicle or following vehicle) and the speeds of the vehicle 1 and the other vehicle around the vehicle 1 are sustained constant speeds (for example, on general roads and trunk roads, 20 km/h and on inter-city highways and city highways, 40 km/h) or less. On the other hand, "noncongested" means a condition other than "congested".

FIG. 9 is a view showing a group of packages relating to the conditions of the driver. The group of packages relating to the driver conditions roughly divides the driver conditions into the five conditions of "sleepy", "tired", "overworked", "distracted", and "normal" and packages permissions for individual driving assistance operations for each of the driver conditions. For this reason, the group of packages relating to the driver conditions includes five unit packages. In the present embodiment, the driver conditions during automated driving are specified by the information of the appearance of the driver detected by the driver monitor camera 31 and information of gripping of the steering wheel detected by the steering wheel touch sensor 32. Specifically, the driver conditions are specified by detecting the facial expression of the driver (direction of face, degree of opening/closing of the eyes, etc.) from the information on the appearance of the driver while referring to the information of gripping of the steering wheel and comparing the detected expression of the driver with an expression according to the driver conditions stored in the ROM in advance.

Note that, the parameters for specifying driver conditions are not limited to the information on the appearance of the driver and information of gripping of the steering wheel. For example, it is also possible to detect the heartbeat, pulse, brainwave, etc. of the driver and compare the same with the heartbeat, pulse, brainwave, etc. corresponding to the driver conditions stored in advance in the ROM so as to specify the driver conditions. In this case, the driver information acquiring device is provided with a heartbeat sensor, a pulse sensor, a brainwave sensor, etc.

Note that, in the present embodiment, "sleepy" means a condition where the concentration of the driver in the driving operation has fallen due to sleepiness but not to an extent requiring the driver to immediately stop driving. "Tired" means a condition where the concentration of the driver in the driving operation has fallen due to tiredness but not to an extent requiring the driver to immediately stop driving. "Overworked" means a condition where the concentration of the driver in the driving operation has fallen due to tiredness to an extent requiring the driver to immediately stop driving. "Distracted" means, for example, when the driver is performing a second task other than the driving operation such as operating a mobile phone, tablet PC, or other mobile device or is viewing a moving image, when the driver is looking at the sides, and other conditions where the concentration of the driver in the driving operation has fallen due to factors other than sleepiness and tiredness. "Normal" means a condition other than "sleepy", "tired", "overworked", and "distracted".

FIG. 10 is a view showing the group of packages relating to the conditions of the host vehicle. The group of packages relating to the host vehicle conditions roughly divides the host vehicle conditions into "unstable" and "stable" and packages permissions for individual driving assistance operations for each vehicle condition. For this reason, the group of packages relating to the host vehicle conditions includes two unit packages. In the present embodiment, the host vehicle conditions are specified based on the acceleration of the vehicle 1 detected by the acceleration sensor 22 and the posture of the vehicle 1 detected by the yaw rate sensor 23.

Note that, in the present embodiment, the "unstable" of the host vehicle conditions means a condition where pitching, rolling, yawing, etc. of the vehicle 1 are continuing and the behavior of the vehicle 1 is disturbed. "Pitching" means the vehicle rocking to the front and back about the horizontal axis in the left-right direction passing through the center of gravity of the vehicle. "Rolling" means the vehicle rocking to the left and right about the horizontal axis in the front-back direction passing through the center of gravity of the vehicle. "Yawing" means the vehicle rocking to the left and right about the vertical axis passing through the center of gravity of the vehicle. On the other hand, "stable" of the host vehicle conditions means a condition other than unstable conditions, that is, a condition where pitching, rolling, yawing, etc. of the vehicle 1 do not occur and the behavior of the vehicle 1 is not disturbed.

<Control by Control Device of Vehicle>

The automated driving system 100 is further provided with a driving plan generating part 90, package extracting part 91, package proposing part 92, and automated driving executing part 93. In the present embodiment, as shown in FIG. 1, the driving plan generating part 90, package extracting part 91, package proposing part 92, and automated driving executing part 93 are parts of the electronic control unit 80 (control device of vehicle).

The driving plan generating part 90 generates a driving plan for automated driving of the vehicle 1. In the present embodiment, the driving plan includes a target route calculated by the navigation system 70 and information on lanes scheduled to be run on along the target route. The driving plan generating part 90 generates the driving plan for automated driving of the vehicle 1 based on the target route calculated by the navigation system 70, the surrounding environment information acquired by the surrounding environment information acquiring device 10, and the vehicle information acquired by the vehicle information acquiring device 20 (in particular, the current position of the vehicle 1).

For example, if an obstacle on the target route (other stopped vehicle, construction site, fallen object, etc.) is detected by the surrounding environment information acquiring device 10, the driving plan generating part 90 selects a lane scheduled to be driven on so as to avoid the obstacle. Specifically, the driving plan generating part 90 generates a driving plan so that the vehicle 1 runs on a lane with no obstacle from a point a predetermined distance before the obstacle up to a point passing the obstacle.

The package extracting part 91 extracts driving assistance packages packing permissions for a plurality of driving assistance operations based on at least one of the surrounding environment information, vehicle information, and driver information. As explained above, in the driving assistance packages, permissions for the individual driving assistance operations are set.

The package proposing part 92 proposes the driving assistance packages to the driver of the vehicle 1 based on the driving assistance packages extracted by the package extracting part 91 and the driving plan generated by the driving plan generating part 90. In the present embodiment, the package proposing part 92 proposes the driving assistance packages extracted by the package extracting part 91 to the driver of the vehicle 1 while assigning priority orders based on the driving plan.

At this time, the package proposing part 92 assigns priority orders to the driving assistance packages extracted by the package extracting part 91 based on the driving plan for example in the following way: If a lane change is required in the driving plan, the package proposing part 92 raises the relative priority orders of driving assistance packages in which a lane change is permitted in order to enable continuation of automated driving. Further, if the lane being driven on is a lane merged with, the package proposing part 92 raises the relative priority orders of driving assistance packages in which a lane change is permitted so as to reduce the possibility of collision with a merging vehicle.

Further, if the destination on the target route is at the opposite side to the passing lane with respect to the lane being driven on, and the distance or time to the destination is shorter than a predetermined length, the package proposing part 92 lowers the relative priority orders of driving assistance packages in which automated passing is permitted so as to reach the destination reliably and safely. Further, if the number of lanes on the target route is reduced to one after a predetermined time or after a predetermined distance, the package proposing part 92 lowers the relative priority orders of driving assistance packages in which automated passing is permitted so as to raise the safety of the automated driving. Further, if the passing lane is a lane merged with, the package proposing part 92 lowers the relative priority orders of driving assistance packages in which automated passing is permitted so as to lower the possibility of collision with a merging vehicle. Further, if a ratio of curves to straight parts of the lane being driven on is a predetermined value or more, the package proposing part 92 lowers the relative priority orders of driving assistance packages in which automated passing is permitted so as to raise the safety of the automated driving. Further, if the maximum value or the average value of a gradient of the lane being driven on is a predetermined value or more, the package proposing part 92 lowers the relative priority orders of driving assistance packages in which automated passing is permitted so as to raise the safety of the automated driving.

The automated driving executing part 93 executes the automated driving of the vehicle 1 based on a driving assistance package proposed by the package proposing part 92 and approved by the driver of the vehicle 1. Specifically, the automated driving executing part 93 executes the driving assistance operations permitted in the driving assistance package proposed by the package proposing part 92 and approved by the driver of the vehicle 1.

According to the above-mentioned control, the driver can set permissions for individual driving assistance operations at one time just by approving a preferred driving assistance package from among the driving assistance packages proposed by the package proposing part 92. Further, the proposed driving assistance packages are assigned priority orders in accordance with the driving plan, so there is a high possibility that the driver will select a driving assistance package suitable for the driving plan. Therefore, the driver can suitably and easily set permissions for individual driving assistance operations in automated driving.

<Control Routine of Vehicle Control>

Figure 11:
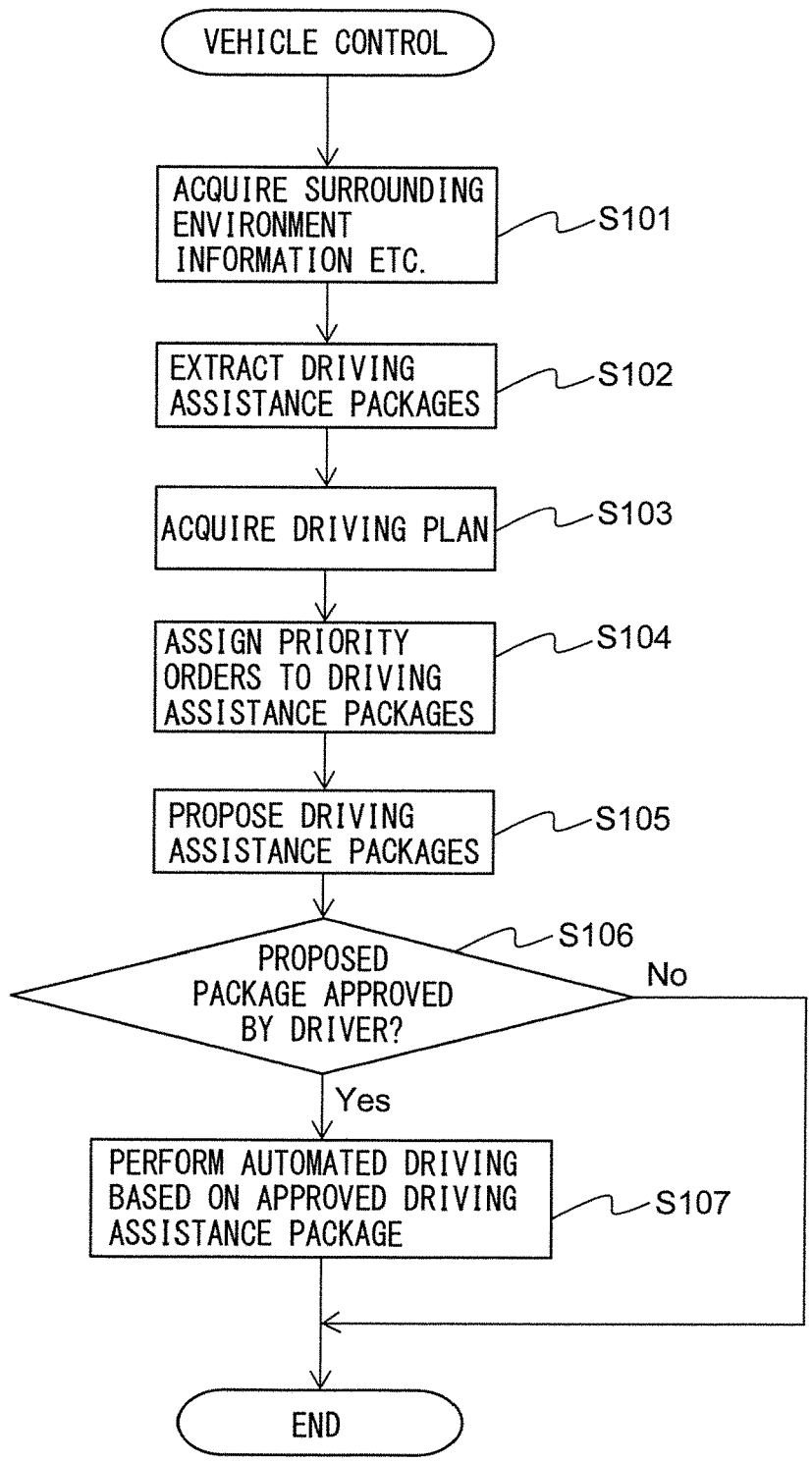
FIG. 11 is a flow chart showing a control routine of vehicle control in the first embodiment of the present disclosure.

Below, referring to the flow chart of FIG. 11, vehicle control by the control device of a vehicle will be explained in detail. FIG. 11 is a flow chart showing a control routine of vehicle control in a first embodiment of the present disclosure. The control routine is repeatedly executed by the control device of a vehicle (electronic control unit 80) at predetermined time intervals while the automated driving mode is selected by driver.

The automated driving mode and manual driving mode are switched by the driver. Note that, the "automated driving mode" is the operating mode where at least one of the driving operations relating to acceleration, steering, and braking is performed by the automated driving system 100. Further, the "manual driving mode" is the operating mode where all driving operations relating to acceleration, steering, and braking are performed by the driver.

First, at step S101, the package extracting part 91 acquires the surrounding environment information, vehicle information, and driver information. The surrounding environment information is acquired by the surrounding environment information acquiring device 10, the vehicle information is acquired by the vehicle information acquiring device 20, and the driver information is acquired by the driver information acquiring device 30. Next, at step S102, the package extracting part 91 extracts driving assistance packages based on the surrounding environment information, vehicle information, and driver information acquired at step S101.

Specifically, the package extracting part 91 first specifies the current conditions of the surrounding environment (in the present embodiment, conditions of the weather, conditions of sunlight, type of road, and conditions of the road), current conditions of the host vehicle, and current conditions of the driver based on the surrounding environment information, vehicle information, and driver information. Next, the package extracting part 91 selects the unit package of the weather condition specified as the current weather condition from the group of packages relating to the weather conditions. For example, the package extracting part 91 selects the unit package of "clear" from the group of packages relating to the weather conditions when specifying that the current weather condition are "clear". Similarly, the package extracting part 91 selects the unit package of the sunlight condition specified as the current sunlight condition from the group of packages relating to the sunlight conditions, selects the unit package of the road type specified as the road type currently being run on from the group of packages relating to the road types, selects the unit package of the road condition specified as the current road condition from the group of packages relating to the road conditions, selects the unit package of the driver condition specified as the current driver condition from the group of packages relating to the driver conditions, and selects the unit package of the host vehicle condition specified as the current host vehicle condition from the group of package relating to the host vehicle conditions.

After selection of the unit packages, the package extracting part 91 determines the driving assistance operations by combining the selected unit packages and extracts driving assistance packages in which at least one running assistance function which can be executed is included. In the present embodiment, the package extracting part 91 determines the driving assistance operations which can be executed by combining the running assistance functions by AND conditions and combining the vision assistance functions and congestion assistance functions by OR conditions. Therefore, in driving assistance operations relating to the running assistance functions, driving assistance operations which are permitted in all unit packages are judged as executable. On the other hand, driving assistance operations which are not permitted in at least one unit package are judged not executable.

Further, regarding the driving assistance operations relating to vision assistance functions and congestion assistance functions, driving assistance operations which are permitted in at least one unit package are judged executable. On the other hand, driving assistance operations which are not permitted in all unit packages are judged not executable.

In this way, in the present embodiment, the running assistance functions are combined by AND conditions while the vision assistance functions and congestion assistance functions are combined by OR conditions, but the methods of combinations are not limited. Combination by AND conditions or OR conditions in accordance with need is also possible. Further, all functions may be combined by AND conditions or OR conditions.

FIG. 12 is a view showing an example of the results of determination of driving assistance operations able to be performed by combining unit packages. FIG. 13 is a view showing driving assistance packages extracted based on the results of combination shown in FIG. 12. The extracted driving assistance packages (candidate 1 to candidate 9) include at least one running assistance function judged executable based on the current surrounding environmental conditions etc. Note that it is necessary to make a lane change in order to pass another vehicle, so driving assistance packages in which automated passing is permitted and automated lane change is not permitted are not extracted. Further, there is little chance of a driver desiring only automated lane change as a running assistance function, so driving assistance packages in which only automated lane change is permitted as a running assistance function are not extracted.

Next, at step S103, the package proposing part 92 acquires the driving plan in automatic driving of the vehicle 1. The driving plan is generated by the driving plan generating part 90 based on the target route calculated by the navigation system 70, the surrounding environment information acquired by the surrounding environment information acquiring device 10, and the vehicle information acquired by the vehicle information acquiring device 20.

Next, at step S104, the package proposing part 92 assigns priority orders to the driving assistance packages extracted at step S102 based on the driving plan acquired at step S103. For example, as shown in FIG. 13, if automated passing is not desirable considering the driving plan, the package proposing part 92 lowers the relative priority orders of driving assistance packages in which automated passing is permitted and raises the relative priority orders of driving assistance packages in which automated passing is not permitted. Further, if automated lane change is desirable considering the driving plan, the package proposing part 92 raises the relative priority orders of driving assistance packages in which automated lane change is permitted and lowers the relative priority orders of driving assistance packages in which automated lane change is not permitted. Further, in other cases, the package proposing part 92 raises the relative priority orders of driving assistance packages with a relatively large number of permitted driving assistance operations and lowers the relative priority orders of driving assistance packages with a relatively small number of permitted driving assistance packages.

Next, at step S105, the package proposing part 92 proposes driving assistance packages extracted at step S102 to the driver while assigning priority orders to the same. At this time, for example, all of the extracted driving assistance packages are simultaneously displayed on the HMI 60 together with their priority orders. Further, the extracted driving assistance packages may be displayed one by one on the HMI 60 in the order of the highest priority order down.

Next, at step S106, the automated driving executing part 93 judges whether any one of the driving assistance packages proposed at step S105 has been approved by the driver. If it is judged that any one of the proposed driving assistance packages has been approved by the driver, the control routine proceeds to step S107. At step S107, the automated driving executing part 93 executes the automated driving based on the approved driving assistance package. Specifically, the automated driving executing part 93 executes the driving assistance operations permitted in the approved driving assistance package. After step S107, the control routine ends.

On the other hand, if at step S106 it is judged that none of the proposed driving assistance packages have been approved by the driver, the control routine ends. In this case, the currently permitted driving assistance operations continue to be executed.

Note that, the package extracting part 91 may acquire at least one of the surrounding environment information, host vehicle information, and driver information at step S101 and extract driving assistance packages based on at least one of the surrounding environment information, host vehicle information, and driver information at step S102.

Second Embodiment

The configuration and control of the automated driving system according to the second embodiment are basically similar to the configuration and control of the automated driving system according to the first embodiment except for the points explained below. For this reason, below, the second embodiment of the present disclosure will be explained focusing on the parts different from the first embodiment.

In the second embodiment, the package proposing part 92 selects driving assistance packages to be proposed to the driver of the vehicle 1 from among the driving assistance packages extracted by the package extracting part 91 based on the driving plan in the automated driving of the vehicle 1.

At this time, the package proposing part 92 selects driving assistance packages to be proposed to the driver of the vehicle 1 from among the driving assistance packages extracted by the package extracting part 91 based on the driving plan for example as follows: If a lane change is required in the driving plan, the package proposing part 92 selects and proposes to the driver driving assistance packages in which lane change is permitted so as to enable continuation of automated driving. Further, if the lane being driven on is a lane merged with, the package proposing part 92 selects and proposes to the driver driving assistance packages in which lane change is permitted so as to reduce collision with a merging vehicle.

Further, if the destination on the target route is at the opposite side to the passing lane with respect to the lane being driven on, and the distance or time to the destination is shorter than a predetermined length, the package proposing part 92 selects and proposes to the driver driving assistance packages in which automated passing is not permitted so as to reliably and safely reach the destination. Further, if the number of lanes on the target route is reduced to one after a predetermined time or after a predetermined distance, the package proposing part 92 selects and proposes to the driver driving assistance packages in which automated passing is not permitted so as to raise the safety of the automated driving. Further, if the passing lane is a lane merged with, the package proposing part 92 selects and proposes to the driver driving assistance packages in which automated passing is not permitted so as to lower the possibility of collision with a merging vehicle. Further, if a ratio of curves to straight parts of the lane being driven on is a predetermined value or more, the package proposing part 92 selects and proposes to the driver driving assistance packages in which automated passing is not permitted so as raise the safety of the automated driving. Further, if the maximum value or the average value of a gradient of the lane being driven on is a predetermined value or more, the package proposing part 92 selects and proposes to the driver driving assistance packages in which automated passing is not permitted so as to raise the safety of the automated driving.

Note that, the driving plan in the automated driving of the vehicle 1 is generated by the driving plan generating part 90 by a method similar to the first embodiment.

According to the above-mentioned control, even if a large number of driving assistance packages are extracted by the package extracting part 91, only driving assistance packages suitable to the driving plan in the automated driving of the vehicle 1 are proposed. For this reason, the driver can suitably and easily set permissions for individual driving assistance operations in automated driving.

<Control Routine of Vehicle Control>

FIG. 14 is a flow chart showing a control routine of vehicle control in a second embodiment of the present disclosure. The control routine is repeatedly executed by the control device of the vehicle (electronic control unit 80) at predetermined time intervals while the automated driving mode is selected by the driver. Step S201 to step S203 in FIG. 14 are similar to step S101 to step S103 in FIG. 11, so explanations will be omitted.

In the present control routine, after step S203, at step S204, the package proposing part 92 selects driving assistance packages to be proposed to the driver among the driving assistance packages extracted at step S202 based on the driving plan acquired at step S203.

For example, in the example shown in FIG. 13, if automated passing is not desirable considering the driving plan, the package proposing part 92 selects the candidate 2 and candidate 5 to 9 driving assistance packages in which automated passing is not permitted. Further, if automated lane change is desirable considering the driving plan, the package proposing part 92 selects the candidate 1 to 4, candidate 6, and candidate 7 driving assistance packages in which automated lane change is permitted. Further, in other cases, the package proposing part 92 selects driving assistance packages in which the number of permitted driving assistance operations is a predetermined value or more, for example, the candidate 1 to 4 driving assistance packages in which the number of permitted driving assistance operations is three or more. Note that, in other cases, the package proposing part 92 may select all of the extracted driving assistance packages. Further, the package proposing part 92 may select one optimal driving assistance package based on the driving plan.

Next, at step S205, the package proposing part 92 proposes the driving assistance packages selected at step S204 to the driver. Step S206 and step S207 are similar to step S106 and step S107 in FIG. 11, so explanations will be omitted.

Third Embodiment

The configuration and control of the automated driving system according to the third embodiment are basically similar to the configuration and control of the automated driving system according to the first embodiment except for the points explained below. For this reason, below, the third embodiment of the present disclosure will be explained focusing on the parts different from the first embodiment.

In the third embodiment, the package proposing part 92 selects driving assistance packages to be proposed to the driver of the vehicle 1 from among the driving assistance packages extracted by the package extracting part 91 based on the driving plan in automated driving of the vehicle 1 and proposes the selected driving assistance packages to the driver of the vehicle 1 while assigning priority orders based on the driving plan of automated driving of the vehicle 1.

At this time, the package proposing part 92 selects driving assistance packages to be proposed to the driver of the vehicle 1 from among the driving assistance packages extracted by the package extracting part 91 and assigns priority orders to the selected driving assistance packages based on the driving plan, for example, as follows. If a lane change is required in the driving plan, the package proposing part 92 selects driving assistance packages in which a lane change is permitted and raises the relative priority orders of driving assistance packages with relatively large numbers of permitted driving assistance operations so as to enable continuation of automated driving. Further, if the lane being driven on is a lane merged with, the package proposing part 92 selects driving assistance packages in which a lane change is permitted and raises the relative priority orders of driving assistance packages with relatively large numbers of permitted driving assistance operations so as to lower the possibility of collision with merging vehicles.

Further, if the destination on the target route is at the opposite side to the passing lane with respect to the lane being driven on and the distance or time to the destination is shorter than a predetermined length, the package proposing part 92 selects driving assistance packages in which automated passing is not permitted and raises the relative priority orders of the driving assistance packages with a relatively large number of permitted driving assistance operations so as to reliably and safely reach the destination. Further, if the number of lanes on the target route is reduced to one after a predetermined time or after a predetermined distance, the package proposing part 92 selects driving assistance packages in which automated passing is not permitted and raises the relative priority orders of the driving assistance packages with a relatively large number of permitted driving assistance operations so as to raise the safety of the automated driving. Further, if the passing lane is a lane merged with, the package proposing part 92 selects driving assistance packages in which automated passing is not permitted and raises the relative priority orders of the driving assistance packages with a relatively large number of permitted driving assistance operations so as to lower the possibility of collision with a merging vehicle. Further, if a ratio of curves to straight parts of the lane being driven on is a predetermined value or more, the package proposing part 92 selects driving assistance packages in which automated passing is not permitted and raises the relative priority orders of the driving assistance packages with a relatively large number of permitted driving assistance operations so as raise the safety of the automated driving. Further, if the maximum value or the average value of a gradient of the lane being driven on is a predetermined value or more, the package proposing part 92 selects driving assistance packages in which automated passing is not permitted and raises the relative priority orders of the driving assistance packages with a relatively large number of permitted driving assistance operations so as to raise the safety of the automated driving.

Note that, the driving plan in the automated driving of the vehicle 1 is generated by the driving plan generating part 90 by a method similar to the first embodiment.

According to the above-mentioned control, even if a large number of driving assistance packages are extracted by the package extracting part 91, only driver assistance packages suitable for the driving plan in automated driving of the vehicle 1 are proposed to the driver together with their priority orders. For this reason, the driver can suitably and easily set permissions for individual driving assistance operations in automated driving.

<Control Routine of Vehicle Control>

FIG. 15 is a flow chart showing a control routine of vehicle control in a third embodiment of the present disclosure. The control routine is repeatedly executed by the control device of the vehicle (electronic control unit 80) at predetermined time intervals while the automated driving mode is selected by the driver.

In the present control routine, after step S303, at step S304, the package proposing part 92 selects driving assistance packages to be proposed to the driver from among the driving assistance packages extracted at step S302 based on the driving plan acquired at step S303.

For example, in the example shown in FIG. 13, if automated passing is not desirable considering the driving plan, the package proposing part 92 selects the candidate 2 and candidate 5 to 9 driving assistance packages in which automated passing is not permitted. Further, if automated lane change is desirable considering the driving plan, the package proposing part 92 selects the candidate 1 to 4, candidate 6, and candidate 7 driving assistance packages in which automated lane change is permitted. Further, in other cases, the package proposing part 92 selects the candidate 1 to 4 driving assistance packages in which the number of permitted driving assistance operations is a predetermined value or more, for example, driving assistance packages in which the number of permitted driving assistance operations is three or more.

Next, at step S305, the package proposing part 92 assigns priority orders to driving assistance packages selected at step S304 based on the driving plan acquired at step S303. For example, the package proposing part 92 raises the relative priority orders of driving assistance packages with a relatively large number of permitted driving assistance operations and lowers the relative priority order of driving assistance packages with a relatively small number of permitted driving assistance operations.

Next, at step S306, the package proposing part 92 proposes the driving assistance packages selected at step S304 to the driver while assigning priority orders to them. At this time, for example, all of the selected driving assistance packages are simultaneously displayed on the HMI 60 together with their priority orders. Further, the selected driving assistance packages may be displayed one by one on the HMI 60 in the order of the highest priority order down.

Step S307 and step S308 are similar to step S106 and step S107 at FIG. 11, so explanations will be omitted.

Above, embodiments according to the present disclosure were explained, but the present disclosure is not limited to these embodiments and can be corrected and changed in various ways within the scope of the claims.

The invention claimed is:

1. A control device of a vehicle for controlling a vehicle comprising:
   a surrounding environment information acquiring device configured to acquire surrounding environment information relating to surrounding environment conditions of a host vehicle;
   a vehicle information acquiring device configured to acquire vehicle information relating to conditions of the host vehicle; and
   a driver information acquiring device configured to acquire driver information relating to conditions of a driver of the host vehicle,
   the control device of a vehicle comprising:
   a driving plan generating part configured to generate a driving plan in automated driving of the host vehicle;
   a package extracting part configured to extract driving assistance packages packaging permissions for a plurality of driving assistance operations based on at least one of the surrounding environment information, the vehicle information, and the driver information;
   a package proposing part configured to propose driving assistance packages to the driver of the host vehicle based on the driving assistance packages extracted by the package extracting part and the driving plan; and
   an automated driving executing part configured to perform driving assistance operations permitted in a driving assistance package proposed by the package proposing part and approved by the driver of the host vehicle.

2. The control device of a vehicle according to claim 1, wherein the package proposing part is configured to propose driving assistance packages extracted by the package extracting part to the driver of the host vehicle while assigning priority orders based on the driving plan.

3. The control device of a vehicle according to claim 1, wherein the package proposing part is configured to select driving assistance packages to be proposed to the driver of the host vehicle from among the driving assistance packages extracted by the package extracting part based on the driving plan.

4. The control device of a vehicle according to claim 1, wherein the package proposing part is configured to select driving assistance packages to be proposed to the driver of the host vehicle from among the driving assistance packages extracted by the package extracting part based on the driving plan, and propose the selected driving assistance packages to the driver of the host vehicle while assigning priority orders based on the driving plan.

* * * * *